May 9, 1967  J. B. McNAMEE  3,318,197
SERVO POSITIONING DEVICE
Filed July 8, 1964 2 Sheets-Sheet 1
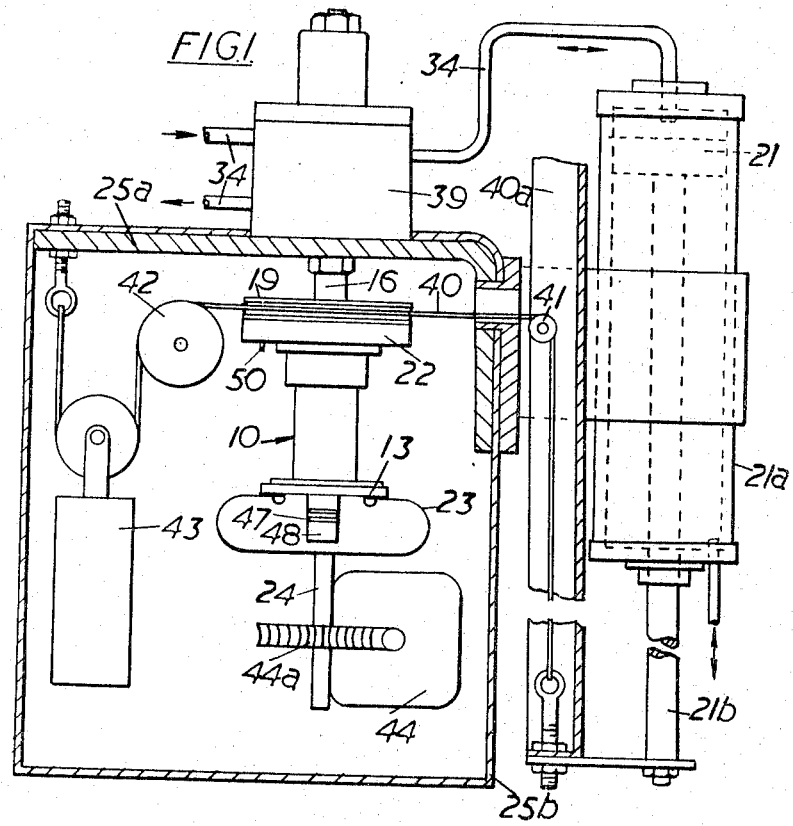
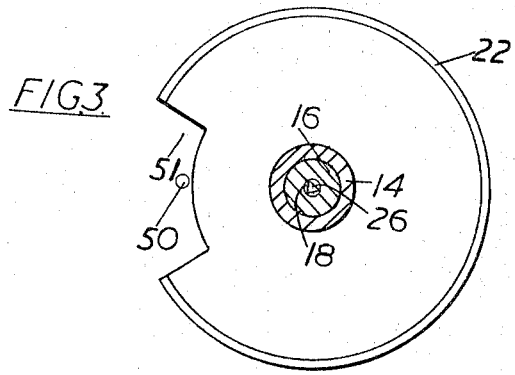
Inventor
JOHN BODEN McNAMEE
By Burgess, Dinklager
Sprung
Attorneys

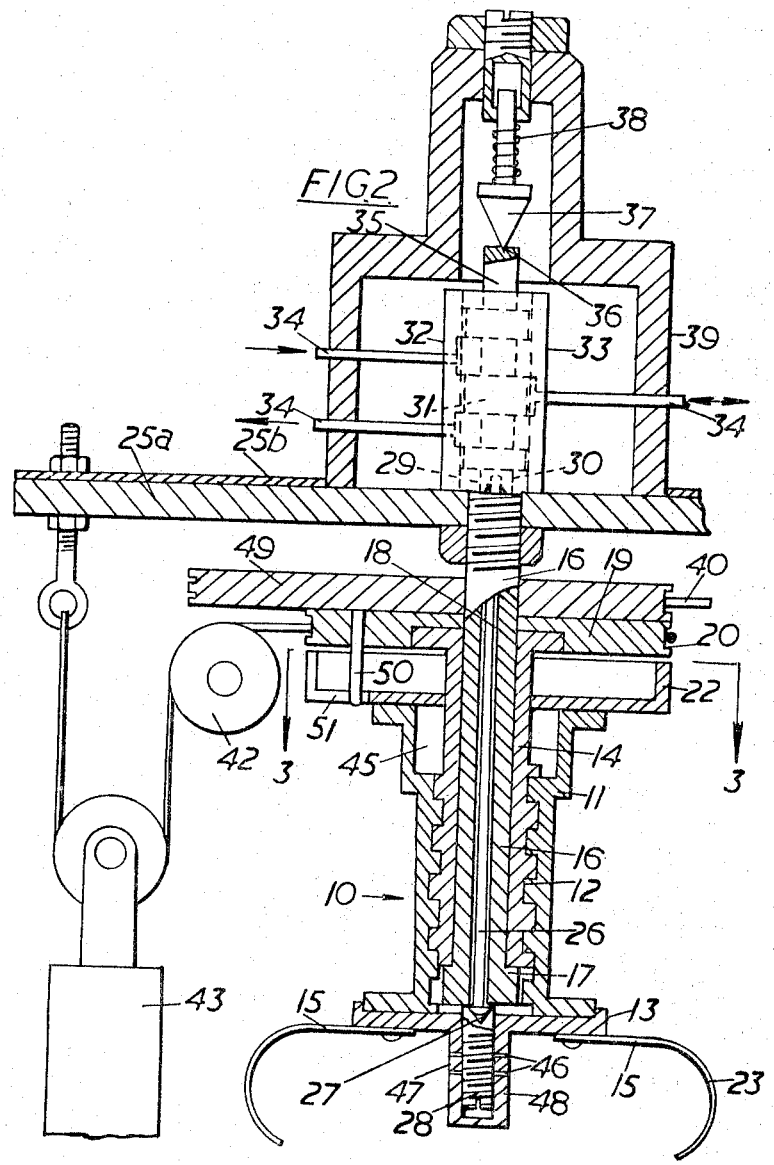

United States Patent Office 3,318,197
Patented May 9, 1967

3,318,197
SERVO POSITIONING DEVICE
John B. McNamee, Ermington, New South Wales, Australia, assignor to McNamee Industries Pty. Limited, Ermington, New South Wales, Australia, an Australian company
Filed July 8, 1964, Ser. No. 381,188
Claims priority, application Australia, July 22, 1963, 33,260/63
8 Claims. (Cl. 91—380)

This invention relates to a mechanism which will act as a servo positioning device and its object is to provide a sensitive mechanical-hydraulic mechanism which shall control the positioning of large members (for example, a bank of tiltable baffles in a boiler flue). It is particularly adaptable for use where the only signal available by which the large members are to be accurately positioned is one of minute electric current or voltage, for example from a thermocouple, or a small change in hydraulic or pneumatic pressure or the like.

The present invention comprises a servo-positioning device comprising a valve arranged to control passage of fluid into and from a cylinder to move a power piston mounted therein; a rectilinearly moveable operating member for said valve arranged to be moved by axial movements of a first rotatable member; a second rotatable member located coaxially with and in threaded engagement with said first rotatable member; means whereby axial movement of said piston resulting from the operation of said valve by said first rotatable member (as a consequence of axial movement of said first rotatable member relative to said second rotatable member) is transmitted to said second rotatable member to cause cancelling relative rotary movement between said first and second rotatable members and the return to their original relative positions of the first and second rotatable members, said valve operating member and said valve.

A preferred embodiment of the present invention will now be described by way of example and with reference to the accompanying drawings, in which FIGURE 1 is a general elevational view of the mechanism, FIGURE 2 is an axial sectional elevation through part thereof, slightly modified and upon an enlarged scale, and FIGURE 3 is a partial sectional plan upon the line 3—3 of FIGURE 2.

The servo-mechanism illustrated, 10, comprises a stepped cylindrical outer driven member 11 having a threaded bore 12 and its lower end blanked off by a member 13 and an intermediate tubular member 14 externally threaded for screwing engagement with the bore 12 of the outer member 11. The intermediate member bore 14 is in rotatable engagement with a support (or inner) member 16 but is axially restrained relative thereto by resting upon an enlarged portion 17 at the lower end thereof. The inner member 16 has an axial round hole 18.

In addition the intermediate member 14 has affixed to its upper end a large concentric disc 19 the periphery of which includes a continuous peripheral groove 20 the circumference of the disc 19 being 1⅓ times (approximately) the stroke of a working piston 21, the movement of which will be controlled by the servo-mechanism 10.

The outer member 11 aforespecified has attached to its upper end a concentric disc 22 the diameter of which is identical with the outside diameter of the disc 19 mounted upon the intermediate member 14. The disc 22 turns with the outer member 11 and thus turns relative to the intermediate member 14.

The outer member 11 has attached to its lower face a coupling 23 whereby a concentric drive shaft 24 may be drivingly connected to the outer member 11 and permit axial movements of the outer member 11 relative to the drive shaft 24. This coupling 23 is preferably a circular or oval member made up from a strip of Phosphor bronze approximately ¾" wide and 30 gauge in thickness which is transversely bowed in cross-section and has been welded into a circle or oval, or alternatively is attached at its ends 15 to the member 13 blanking off the end of the outer member 11.

Diametrically opposed points on this member 23 are attached to the outer member 11 through the member 13 and the drive shaft 24 is attached thereto to locate them in axial alignment one with the other. Any axial movement of the outer member 11 relative to the drive shaft 24 is accommodated by the coupling ring 23 deforming from its normal shape.

The unit 10 is supported upon a frame 25a and the whole unit is located within a casing 25b from the upper end of the inner member 16 aforementioned which is threaded into and non-rotatable relative to the frame 25a.

Through the axial hole 18 in the inner member 16 a triangular cross-section rod 26 passes freely. (The flats on this rod provide oil channels.) This rod 26 has a conically pointed lower end 27 for engagement with a cup in the upper end of a screw 28 which passes through the blank end 13 of the outer member 11 and is adjustable as to its penetration into the bore of the outer member 11. The upper end of the triangular rod 26 enters a conical recess 29 in the lower end of a shaft 30 extending downwardly from a spool 31 to which it is secured and which forms the vertically sliding member in a hydraulic slide valve 32.

The spool 31 is the sliding member of a sliding valve whereby ports in the valve body are subjected to fluid feed and/or exhaust conditions. This particular spool 31 is housed in a valve body 33 which is fastened to the aforementioned support frame 25a and includes three ports 34, an inlet port, an exhaust port and an outlet port to the large bore end of a cylinder 21a housing the piston 21. The inlet port to the valve body is under constant fluid pressure, the outlet port is connected to the piston head end of the piston cylinder 21a aforementioned and the small bore (or piston rod end) of the cylinder is under constant oil pressure from the source of high pressure oil.

The spool 31 (or moving valve member) in the present valve 32 is adapted to make the valve a zero lap valve, that is, the fluid outlet port where it leaves the bore of the valve body 33 is the same height as the height of the full diameter portion of the spool, so that the spool 31 if moved minutely one way or the other from a central position in front of the outlet port will permit oil to flow in or out of the large bore end of the cylinder 21a.

The spool 31 has a spindle axially projecting from each of its ends and each extends beyond one end of the valve body. The valve 32 is arranged vertically so there will be a lower spindle (the spindle 30 aforementioned) and an upper spindle 35. The lower spindle 30 is the one which engages the upper end of the triangular rod 26. The upper spindle 35 of the spool is provided with a conical recess 36 for receiving the conical point 37 of an adjustably spring-biassed downwardly thrusting member 38 supported by an extension 39 of the aforementioned support frame 25a. The spool 31 and the triangular rod 26 are thus urged downwardly into engagement with a screw 28 projecting into the outer member 11.

Basic adjustments are now made so that the spool 31 lies slightly to one side of the fluid inlet port so that a minute bleed of fluid is always present to act upon the larger face of the working piston 21, to make up for the internal leakage of the spool valve.

The latter serves as a gradually operating pressure reducing valve for the large bore end of the cylinder 21a.

The working piston rod 21b is attached to say, a bank of baffles in a boiler flue or other part to be adjusted in position and also to a flexible wire cable 40 which runs over a pulley 41 and makes one complete turn around the grooved disc 19 mounted upon the intermediate member 14. Where possible the path of the wire 40 is through a tamper proof conduit 40a. It then continues over a further pulley 42 and has a counter-weight 43 (or equivalent spring) attached to it. Weight 43 serves merely as a tensioning means for the wire 40. Any movement of the piston 21 in the cylinder therefore will rotate the intermediate member 14.

In operation a minute electric signal from a sensing device (not shown) is amplified and converted to rotary motion (by any convenient means). The rotary motion is applied to the drive shaft 24 in any convenient manner and therefore turns the outer member 11. In the embodiment illustrated the electrical signal is amplified and operates a reversing motor 44, which drives the drive shaft 24 through a worm gear 44a.

The rotary motion must respond to (+) or (−) signals and give corresponding clockwise or anti-clockwise movements to the drive shaft 24.

The initial setting of the device is such with the valve 30 in the neutral position, the screw 28 is spaced from the lower end of the inner member 16 so that the rod 26 can be moved up or down by movement up or down of the outer member 11.

Assume a clockwise motion of short duration which is transmitted to the outer member 11. The outer member will thread itself (say downwardly) along the intermediate member 14, allowing the triangular section rod 26 to move downward under the influence of spring 38, and then stop. The spool 31 will move downwardly in the valve 32 and fluid will flow to the large side of the working piston. The piston moves downwardly, and the wire 40 rotates the disc 19. The disc 19 is fixedly secured to the intermediate member 14, and therefore the wire rotates the intermediate member 14 (arranged to be also a clockwise rotation). Accordingly the intermediate member 14 moves relative to the outer member 11 in the direction in which the latter has already moved so the outer member 11 moves upwardly with respect to the intermediate member 14. (The intermediate member turns on the inner member 16, and lifts the outer member 11, thus moving outer member 11 toward its original position.) As the original relative position of the outer and intermediate members is approached the spool 31 is returned to its original position and in so doing slowly blocks off the fluid inlet port to the large bore end of the cylinder 21a, the working piston 21 slows down to a gradual stop in its new position (lower than its original position) where it is held firm in a hydraulic lock position, the fluid in the large bore end being kept at the correct pressure to equal the force of the oil pressure on the small bore end by its pressure reducing characteristic aforementioned. If a counterclockwise motion is imparted to the shaft 24, the device will operate in a corresponding manner to raise the piston 21 in cylinder 21a.

To further illustrate, the mechanism is so sensitive that almost as soon as the spool 31 moves the piston 21 is subjected to fluid pressure and hence the "feed back," that is the signal transmitted by the flexible wire 40 to the intermediate member 14, follows very quickly after the movement of the outer member 11.

If the outer member 11 continues to move and is still moving when the "feed back" signal commences, a lag is established between the rotations of the intermediate and outer member. This lag results in only a small displacement of the spool 31 ever being established with a consequent slow continuous movement of the piston 21.

The lag is small so that, when the outer member 11 ceases to rotate only a fraction of a turn of the intermediate member 14 remains until the spool 31 is back in its initial position. To prevent any possibility of the spool 31 being grossly displaced for example by rotating the shaft 24 with no oil pressure to displace the piston and thus provide no feed-back signal, there is provided a peg 50 located in the disc 19 which engages in an arcuate cut-out 51 of short length in the disc 22, which as stated above, is secure to outer member 11 for rotation therewith and rotation relative to intermediate member 14.

The disc 22 on the outer member 14 is graduated and, observations enable an operator to readily ascertain the position of the piston 21 in the cylinder, also the two discs 19 and 21 will always return to their original relative positions (also marked) this gives a ready check on any mal-functioning of the unit.

The thread between the intermediate member 14 and the outer member 11 is preferably designed to have a self-locking action, and for good wearing properties is of square section.

The wire connection 40 can be replaced by linkage if so desired.

The intermediate member 14 and the outer member 11 are arranged to provide a reservoir for oil 45 which can flow up and down around the triangular section rod 28 and through oil ways provided as the two member 11 and 14 move relatively. Oil gaskets 46 are included at the joints between a locknut 47 and a cap 48 on the screw 28.

Additionally to the foregoing equipment there may be provided a disc 49 co-axial with and coupled to the disc 19, this arrangement is shown in FIGURE 2. The disc 19 is still connected to the counterweight 43. The discs 19 and 49 are secured together. The cable 40 passes around and is attached to the disc 49. Nonlinear relationship may be produced between the feed back signal arising from the movements of the piston 21 and the rotation transferred to the shaft 24 due to the piston movement, by giving the member 49 a suitable cam shaped periphery.

Optional equivalent variations of the foregoing construction for individual or combined use include the provision of manual control means for rotating the shaft 24; the provision of an air operated control valve in place of the "zero lap" hydraulic valve hereinbefore described; the inclusion of a valve not of the "zero lap" type which although less sensitive in action acts satisfactorily; or any convenient system whereby for example the movement of a stroking piston (air or oil operated) can be converted to rotary or arcuate motion for rotating the shaft 24 clockwise and anticlockwise.

In an alternative construction (not illustrated) a four-ported reversing valve is employed to direct oil (or compressed air) to either end of the cylinder 21a and exhaust it from the other end thereof.

I claim:

1. A servo positioning device consisting of the combination of a cylinder, a piston in said cylinder, a valve arranged to control passage of fluid into and from the piston of said cylinder, a rectilinearly movable rod arranged by its movement to move said valve, a first rotatable member coaxially surrounding and arranged by its rotation to impart rectilinear motion of said movable rod, a second rotatable member located coaxially within and in threaded engagement with said first rotatable member, said second rotatable member also surrounding said rod, a non-rotatable hollow member located coaxially within said second rotatable member, and a connection between said piston and said second rotatable member arranged upon movement of said piston to impart rotation to said second rotatable member in a circular direction such as to restore the relative positions of said first and second rotatable members and the return to their original positions of said rectilinearly movable rod and said valve.

2. The combination claimed in claim 1 including also a further rotatable member attached to said second rotatable member, the connection specified from said piston being to said further rotatable member and thence to said second rotatable member.

3. The combination claimed in claim 2 wherein the driving connection specified comprises a flexible element in circumferential engagement with said further rotatable member.

4. The combination claimed in claim 3 comprising also a counterweight arranged to maintain tension in the flexible element specified throughout its length.

5. The combination claimed in claim 3 wherein the further rotatable member specified is circular and concentric with said second rotatable member.

6. The combination claimed in claim 3 wherein the further rotatable member specified has a cam shaped periphery.

7. The combination claimed in claim 6 comprising also a circular disc secured to said second rotatable member and concentric therewith, together with a second flexible element in peripheral engagement with said disc and a counterweight arranged to act upon said second flexible element to tension the latter.

8. The combination claimed in claim 2 together with a peg upon the further rotatable member in engagement with a cut-out portion of a part secured to said first rotatable member.

References Cited by the Examiner
UNITED STATES PATENTS

| | | | |
|---|---|---|---|
| 257,796 | 5/1882 | Williamson et al. | 91—380 |
| 786,652 | 4/1905 | Larsson | 91—428 |
| 786,653 | 4/1905 | Larsson | 91—380 |
| 1,108,443 | 8/1914 | Janney | 91—380 |
| 1,220,424 | 3/1917 | Janney | 91—380 |
| 2,960,071 | 11/1960 | Rosebrook | 91—380 |
| 2,984,217 | 5/1961 | Cline | 91—380 |

MARTIN P. SCHWADRON, *Primary Examiner.*

PAUL E. MASLOUSKY, *Examiner.*